United States Patent [19]

Mimura et al.

[11] Patent Number: 5,002,825

[45] Date of Patent: Mar. 26, 1991

[54] SURFACE POROUS FILM

[75] Inventors: Takashi Mimura, Otsu; Kenji Tsunashima, Kyoto; Kouichi Adachi, Otsu, all of Japan

[73] Assignee: Toray Industries, Inc., Tokyo, Japan

[21] Appl. No.: 532,212

[22] Filed: Jun. 1, 1990

[30] Foreign Application Priority Data

Jun. 2, 1989 [JP] Japan .................................... 1-14200

[51] Int. Cl.[5] ................................................ B32B 3/26

[52] U.S. Cl. .............................. 428/315.5; 428/315.7; 428/323; 428/331

[58] Field of Search .................. 428/315.5, 315.7, 323, 428/331

[56] References Cited

U.S. PATENT DOCUMENTS 4,460,637 7/1984 Miyamoto et al. ................ 428/331

FOREIGN PATENT DOCUMENTS 59-217665 12/1984 Japan ................................ 428/315.5

3237381A1 7/1983 Fed. Rep. of Germany .

*Primary Examiner*—William J. Van Balen

*Attorney, Agent, or Firm*—Austin R. Miller

[57] ABSTRACT

Disclosed is a surface porous film which is suited as a base film for printing such as offset printing and for ink-jet recording. The surface porous film of the present invention comprises a plastic base film; and a porous layer formed on at least one of the surfaces of said plastic base film, said porous layer having a peak pore diameter of 0.06–2.0 μm and an undulation index of 0.035–0.3 μm.

7 Claims, No Drawings

SURFACE POROUS FILM

BACKGROUND OF THE INVENTION

I. Field of the Invention

The present invention relates to a surface porous film. More particularly, the present invention relates to a surface porous film which is suitable as a film for printing such as offset printing and for ink-jet recording, and suitable as an anti-fog film, etc.

II. Description of the Related Art

Since plastic films have poor water or oil absorption, when they are used as a film for offset printing or ink-jet recording, a porous layer for absorbing the ink or the solvent in the ink is formed on the surface of the plastic film.

The conventional films are well-known in the art, which have a porous surface layer containing large particles of an inorganic filler such as talc, calcium carbonate, kaolin or clay, or organic powder such as plastic pigment, in which surface layer the porosity is assured by the clearance among the particles (Japanese Patent Publication No. 22997/88).

However, in such conventional films, since the porosity is provided by the clearance among the particles, the pores are connected one another and the pore size is not uniform. Therefore, the ink is likely to flow in the lateral direction so as to cause blotting of the ink or to show non-uniform ink absorption. Further, since a large amount of large inorganic particles are contained, the smoothness of the surface of the film is low and non-printed spots in the form of pin holes and irregularity of the printing are likely to generate due to the dropping off of the particles. Further, since the strength of the coated layer is small, dust is likely to generate when the films are cut.

SUMMARY OF THE INVENTION

Accordingly, the object of the present invention is to provide a surface porous film which adsorbs the ink or the solvent in the ink very well so that the drying speed of the printed surface is promoted, of which surface is smooth, which exhibits excellent transcription and no blotting of the ink so that the clearness of the printing is high, and which has high strength of the coated layer.

The present inventors intensively studied to find that if a porous layer with a specific peak pore diameter and specific undulation index is formed on the surface of a base film, the above-mentioned object may be attained.

That is, the present invention provides a surface porous film comprising a plastic base film and a porous layer formed on at least one of the surfaces of said plastic base film, said porous layer having a peak pore diameter of 0.06 -2.0 μm and an undulation index of 0.035–0.3 μm.

The surface porous film of the present invention absorbs the ink or the solvent in the ink very well so that the drying speed of the printed surface is promoted. The surface of the film of the present invention is smooth and the film exhibits excellent transcription and no blotting of the ink so that the clearness of the printing is high. Further, the surface of the film of the present invention has large strength. Thus, the surface porous film of the present invention may suitably be used as a base film for offset printing or ink-jet recording, or an anti-fog film.

DETAILED DESCRIPTION OF THE PREFERRED EMBODIMENTS

As mentioned above, the film of the present invention contains a plastic base film. As the base film, any plastic film known in the art may be employed. Examples of the plastic films which may be employed as the base film in the present invention include polyester films, polycarbonate films, triacetylcellulose films, cellophane films, polyamide films, polyimide films, polyphenylenesulfide films, polyetherimide films, polyethersulfon films, aromatic polyamide films, polysulfon films and polyolefin films. Among these, in view of the mechanical properties, thermal properties and economy, polyester films, polycarbonate films, and polyphenylene sulfide films are especially preferred.

Polyester is a collective name for the polymers in which an ester bond is a major bond of the main chain. Preferred examples of the polyester used for forming the film include polyethylene terephthalate, polyethylene 2,6-naphthalate, polyethylene α, β-bis(2- chlorophenoxy)ethane 4,4'-dicarboxylate, and polybutylene terephthalate. Among these, in view of the quality of the film and economy, polyethylene terephthalate is most preferred. Thus, in the description below, those having polyethylene terephthalate film as the base film will be described in detail.

The polyethylene terephthalate (hereinafter referred to also as "PET" for short) employed in the present invention contains not less than 80 mol %, preferably not less than 90 mol %, more preferably not less than 95 mol % of ethylene terephthalate repeating units. As long as the content of the ethylene terephthalate repeating units is within the range just mentioned above, another acid component and/or another glycol component may be copolymerized. Examples of the acid component which may be copolymerized include the following:

isophthalic acid, 2,6-naphthalene dicarboxylic acid, 1,5-naphthalene dicarboxylic acid, 2,7-naphthalene dicarboxylic acid, 4,4'-diphenyl dicarboxylic acid, 4,4'-diphenylsulfon dicarboxylic acid, 4,4'-diphenylether dicarboxylic acid, p-β-hydroxyethoxy benzoic acid, azipic acid, azelaic acid, sebacic acid, hexahydroterephthalic acid, hexahydroisophthalic acid, ε-oxycapronic acid, trimellitic acid, trimesic acid, pyromellitic acid, α, β-bisphenoxymethane-4,4'-dicarboxylic acid, α, β-bis(2-chlorophenoxy)ethane-4,4'-dicarboxylic acid and 5-sodium sulfoisophthalic acid.

Examples of the glycol component which may be copolymerized in the PET include the following:

propylene glycol, butylene glycol, hexamethylene glycol, decamethylene glycol, neopentyl glycol, 1,1-cyclohexane dimethanol, 1,4-cyclohexane dimethanol, 2,2-bis(4β-hydroxyethoxyphenyl)propane, bis(4β-hydroxyethoxyphenyl)sulfon, diethylene glycol, triethylene glycol, pentaerythritol, trimethylol propane and polyethylene glycol.

In the above-described PET, known additives such as heat stabilizers, anti-oxidants, anti-weather stabilizers, UV absorbers, organic lubricants, pigments, dyes, organic or inorganic particles, fillers, releasing agents, anti-static agents, nucleating agents and the like may be incorporated. The intrinsic viscosity (determined in o-chlorophenol at 25° C.) of the PET may preferably be 0.40–1.20 dl/g, more preferably 0.50–0.80 dl/g, still more preferably 0.55–0.75 dl/g.

Although the PET film may be non-oriented, uniaxially oriented or biaxially oriented, biaxially oriented PET film is preferred in view of the mechanical strength. The biaxially oriented PET film may be prepared by stretching a non-oriented PET sheet or film in the longitudinal and transverse directions to 2.5–5 times the original length, respectively, and it shows a pattern of biaxial orientation when examined by wide angle X-ray diffraction.

It is preferred to employ a PET film of which surfaces are treated by a known technique such as corona discharging treatment (in the air, nitrogen or in carbon dioxide gas) or adhesion-promoting treatment because the adhesion with the porous layer, water resistance, solvent resistance and the like are improved. The adhesion-promoting treatment may be performed by any known method. For example, various adhesion-promoting agents such as acryl-based, urethane-based, polyester-based, mixtures thereof or grafted copolymers thereof may be coated on the PET film in the production of the film, or may be coated or laminated on the film by co-extrusion, or may be coated or laminated on the film after uniaxial or biaxial stretching.

The base film may be transparent or colored. When the film is to be used as a base film for printing, those of which degree of whiteness is promoted to not less than 80% by incorporating inorganic particles such as $TiO_2$ and $CaCO_3$ are especially preferred in view of the good appearance after printing.

It should be noted that base films having a porous structure containing bubbles therein have excellent flexibility and cushioning property, so that they exhibit excellent transcription of ink during printing. Among others, polyester films of which specific gravity is reduced to not more than 1.0 g/cm$^3$ by virtue of the porous structure are especially preferred.

Although the thickness of the base film is not restricted, the base film may usually have a thickness of 1–500 μm, preferably 10–300 μm, more preferably 30–250 μm. The average center line surface roughness of the base film may usually be 0.001–0.3 μm, preferably 0.005–0.2 μm, still more preferably 0.01–0.1 μm.

As mentioned earlier, the surface porous film of the present invention has a porous layer coated or laminated on at least one surface of the base film. The porous layer has a number of pores at the surface and inside thereof. In view of the absorption of ink or the like, the pores are preferably through pores which communicates to the outside.

The peak pore diameter in the pore diameter distribution curve of the porous layer is 0.06–2.0 μm, preferably 0.08–1.0 μm, more preferably 0.10–0.5 μm. If the peak pore diameter in the pore diameter distribution curve is smaller than 0.06 μm, the absorption of the ink or the like is insufficient. On the other hand, if the peak pore diameter is larger than 2.0 μm, the smoothness of the surface is degraded and so non-printed spots may be generated in printing.

The undulation index of the porous layer is 0.035–0.3 μm, preferably 0.045–0.2 μm, more preferably 0.055–0.13 μm. If the undulation index of the porous layer is less than 0.035 μm, the absorption rate of the ink or the solvent is low, so that the printed face may be transcribed to the backside of another film when the printed film is wound after offset printing or the printed films are stacked. On the other hand, if the undulation index is more than 0.3 μm, pinhole-like nonprinted spots are likely to generate so that the clearness of the printing is degraded.

The area pore ratio of the porous layer is preferably 20–85%, more preferably 30–75%, still more preferably 35–65%. If the area pore ration is less than 20%, the absorption of the ink or the like may be disturbed, and if it is more than 85%, a part of the pores is likely to be connected, so that the blotting of the ink is likely to occur and the clearness of the printing may be degraded.

It is preferred that the pores in the porous layer be independent each other and have a circularity (r) of 1–5 (r=b/a, wherein a represents longer diameter of a pore and b represents shorter diameter of the pore) when viewed from the surface of the porous layer because the blotting of the ink scarcely occur. The circularity should be an average of at least 1000 measuring points and may be determined by using an image analyzer.

The distribution of the pore diameter is preferably small. That is, not less than 50%, preferably not less than 60%, still more preferably not less than 70% of the pores have a diameter within ±30% of the peak pore diameter.

The center line surface roughness of the porous layer may preferably be not larger than 0.5 μm, preferably not larger than 0.3 μm, still more preferably not larger than 0.1 μm. If the center line surface roughness is within this range, the transcription of the ink is good so that the generation of the non-printed spots in the form of pinholes is reduced.

The thickness of the porous layer may usually be 0.1–50 μm, preferably 1–30 μm, still more preferably 3–20 μm. If the porous layer is too thin, the absorption of the ink or the like may be degraded and if it is too thick, the flexibility of the porous layer may be reduced.

It is preferred to give anti-static property to at least one surface of the surface porous film of the present invention. By so doing, the ease of transportation of the film in the batch printing may be promoted. The anti-static treatment may be performed on either the porous layer or the opposite surface of the film. The surface specific resistance of the treated surface may preferably be $10^8$–$10^{12}$Ω/□. The antistatic treatment may be performed by blending a known anti-static agent in the porous layer in the amount not adversely affecting the effect of the present invention or by applying a known anti-static agent on the surface of the film on which the porous layer is not formed. Particularly, it is preferred to employ an anti-static layer containing 5–40% by weight of sulfonic groups and/or salts of polystyrene as an undercoat layer because the adhesion of the porous layer may also be promoted.

The process of producing the surface porous film of the present invention will now be described. It should be noted that the production process of the film is not restricted to that described below.

The porous layer may be prepared by mixing a water-dispersible polymer and specific colloidal silica in a specific mixing ratio and applying the mixture on the base film, followed by drying the applied mixture. The water-dispersible polymer used herein may be an aqueous dispersion of various polymers. Examples of the water-dispersible polymers which may be employed in the present invention include acrylic polymers, ester-based polymers, urethane-based polymers, olefin-based polymers, vinylidene chloride-based polymers, epoxy-based polymers, amide-based polymers, modifications thereof and copolymers thereof, and aqueous dispersion of these polymers may be used in the production process of the film. In view of the sharp distribution of the pore diameter and of the large area pore ratio, acrylic polymers and urethane-based polymers are preferred and among these, acrylic polymers are especially preferred in view of the mechanical stability of the coating solution and strength of the coated layer.

The water-dispersible polymer used in the production process of the film of the present invention may preferably be in the form of particles when it is dispersed in water. If the polymer is not in the form of particles when it is dispersed in water, that is, if a water-soluble polymer or a polymer dissolved in an organic solvent is employed, it is difficult to make the layer porous. Although the particles may preferably be primary particles, those containing secondary aggregated particles may also be used.

The acrylic polymer which may preferably be employed for the construction of the porous layer may preferably be a polymer or a copolymer containing not less than 40 mol % of acrylic monomers and/or methacrylic monomers and/or ester-forming monomers thereof. The acrylic monomers may contain one or more functional groups. Examples of the acrylic monomers which may be employed include acrylic acid, methacrylic acid, alkylacrylate, alkylmethacrylate (wherein examples of the alkyl groups include methyl, ethyl, n-propyl, isopropyl, n-butyl, isobutyl, t-butyl, 2-ethylhexyl, lauryl, stearyl and cyclohexyl), phenylacrylate, phenylmethacrylate and benzylacrylate, benzylmethacrylate; hydroxyl group-containing monomers such as 2-hydroxyethylacrylate, 2-hydroxyethylmethacrylate, 2-hydroxypropylacrylate and 2-hydroxypropylmethacrylate; amid group-containing monomers such as acrylamide, methacrylamide, N-methylacrylamide, N-methylmethacrylamide, N-methylolacrylamide, N-methylolmethacrylamide, N,N-dimethylolacrylamide, N-methoxymethylmethacrylamide and N-phenylacrylamide; amino group-containing monomers such as N,N-diethylaminoethylmethacrylate and N,N-diethylaminoethylacrylate; epoxy group-containing monomers such as glycidylacrylate and glycidylmethacrylate; and salts (sodium salt, potassium salt, ammonium salt and the like) of acrylic acid and methacrylic acid.

These monomers may be copolymerized with other monomers. Examples of the other monomers include epoxy group-containing monomers such as acrylglycidyl ether; monomers containing sulfonic acid group and salts thereof such as styrene sulfonic acid, vinylsulfonic acid and salts (sodium salt, potassium salt, ammonium salt and the like) thereof; carboxylic group-containing monomers and salts thereof such as chrotonic acid, itaconic acid, maleic acid, fumaric acid and salts thereof; acid anhydride-containing monomers such as maleic anhydride and itaconic anhydride; vinyl isocyanate, allyl isocyanate, styrene, vinylmethyl ether, vinylethyl ether, vinyltrisalkoxy silane, alkylmaleic acid monoester, alkylfumaric acid monoester, acrylonitrile, methacrylonitrile, alkylitaconic acid monoester, vinyl chloride, vinyl acetate and vinylidene chloride.

The above-described monomers may be employed individually or in combination.

The colloidal silica Which is preferably admixed with the above-described water-dispersible polymer so as to generate undulation in the porous layer may preferably be colloidal silica containing a plurality of linearly connected primary particles, the connected particles being able to be dispersed in water substantially without accompanying the dissociation of the connected particles. The linearly connected particles may be in the form of a substantially straight line, bent line, branched line, curved line or a ring. Among these, those which have elongated shape in the form of a branched or bent line are preferred because it is easy to attain the undulation of the porous layer defined in the present invention. The colloidal silica containing elongated linearly connected particles may preferably be those in which the spherical silica particles are connected each other via a divalent or multivalent metal ion. However, those in which the spherical silica particles are connected by other inorganic particles such as alumina, ceria and titania may also be employed. Examples of the divalent or multivalent metal ions which may be employed for connecting the silica particles include $Ca^{2+}$, $Zn^{2+}$, $Mg^{2+}$, $Ba^{2+}$, $Al^{3+}$ and $Ti^{4+}$. Among these, alkaline cations such as $Ca^{2+}$ and $Mg^{2+}$ are preferred for attaining the undulation of the porous layer defined in the present invention.

The diameter of the primary silica particles may preferably be 5–100 nm, more preferably 7–50 nm, still more preferably 8–30 nm because the pore-forming ability is high and the area pore ratio can be made large. As mentioned above, the undulation of the porous layer may be well attained when the silica primary particles are linearly connected in the form of an elongated branched line or bent line.

The number of the primary particles connected one another may preferably be not less than 3 and not more than 100, more preferably not less than 5 and not more than 50, still more preferably not less than 7 and not more than 30. If the number of the primary silica particles connected one another is less than 3, the undulation as defined in the present invention may not be attained. On the other hand, if the number of the primary silica particles is not less than 100, the viscosity of the aqueous dispersion may be increased and the water-dispersibility of the silica sol is degraded.

The content of the linearly connected silica primary particles in the form of branched line or bent line in the porous layer may be 3–80% by weight, preferably 10–70% by weight, still more preferably 20–60% by weight. If the content of the silica particles is less than 3% by weight, the porosity of the layer as well as the undulation thereof may not be attained so that the absorption rate of the ink or the like may be small. On the other hand, if the content of the silica particles is more than 80% by weight, the pore-forming ability is decreased so that the pore size and the area pore ratio are made small. As a result, the absorption rate of the ink is decreased. Further, since the strength of the coated layer is low, dust is likely to generate when the film is cut.

The porosity of the porous layer varies depending on the average particle size of the water-dispersible polymer and of the silica particles. The average particle size of the colloidal silica should be smaller than that of the water-dispersible polymer. If the average particle size of the colloidal silica is the same as or larger than that of the water-dispersible polymer, it is difficult to make the porous layer. It should be noted that in case of the elongated linearly connected silica particles, the shorter diameter of the connected particles is defined as the particle size, and the average value of 100 measured points is defined as the average particle size. The ratio of the average particle size of the water-dispersible polymer to that of the colloidal silica may be 2/1–1000/1, preferably 5/1–500/1, more preferably 10/1–200/1.

A number $\alpha$ is defined as the minimum number of the colloidal silica, which is required for completely covering one particle of the water-dispersible polymer ($\alpha = 2\pi(a_1+a_2)^2/3^{\frac{1}{2}}\cdot a_1^2$), wherein $a_1$ is the average particle size of the colloidal silica and $a_2$ is the average particle size of the water-dispersible polymer. When the ratio of the average particle size ($a_1$) of the colloidal silica and the average particle size ($a_2$) of the water-dispersible polymer is within the range just mentioned above, it is preferred to mix the colloidal silica with the water-dispersible polymer in the ratio that $0.3\alpha$–$10\alpha$, preferably $0.5\alpha$–$6\alpha$, still more preferably $0.7\alpha$–$3\alpha$ of the colloidal silica is mixed with one particle of the water-dispersible polymer because the advantageous effect of the present invention is prominently exhibited.

In the porous layer, known additives such as inorganic and organic particles, plasticizers, lubricants, surface active agents, anti-static agents, crosslinking agents, crosslinking catalysts, heat-resisting agents and anti-weather agents may be incorporated in the amount not adversely affecting the effect of the present invention. Incorporation of an anti-static agent is preferred for preventing that two or more films are simultaneously fed in the batch printing process. Addition of a crosslinking agent or a crosslinking catalyst is preferred for promoting the strength, chemical resistance and heat resistance of the coated layer.

The aqueous dispersion containing the water-dispersible polymer and the colloidal silica may be applied to a surface of the base film by any of the known methods such as gravure coating method, reverse coating method, bar coating method, kiss coating method and die coating method.

The methods of evaluation of characteristics of the films and effects of the invention will now be described in summary.

(1) Pore Diameter Distribution Curve

The porous layer is electromicrographed at 10,000 magnification and the pores are marked. The marked pores are analyzed with an image analyzer (QUant:met-720 type image analyzer commercially available from Image Analyzing Computer, Co., Ltd). The minimum pore diameter and the maximum pore diameter of the pores are determined converting the pores to real circles. The difference between the minimum and maximum pore diameters is divided in intervals of 10 nm and the number of pores in each interval is counted. Using the thus obtained values, a pore diameter distribution curve is drawn taking the pore diameter along the abscissa and the number of the pores per a unit area along the ordinate. The peak pore diameter is determined from the thus prepared pore diameter distribution curve.

(2) Area Pore Ratio

The area occupied by the pores in a unit area is calculated from the above-described pore diameter distribution curve by the following equation:

$$\text{Area Pore Ratio (\%)} = \frac{\sum_i \frac{\pi a_i^2 \cdot n_i}{4}}{A} \times 100$$

wherein $a_i$ represents the average pore diameter in an interval which is defined by dividing the distribution of the pore diameter in the measured area by 10 nm, $n_i$ represents the number of pores in an interval which is defined by dividing the distribution of the pore diameter in the measured area by 10 nm, and A represents the measured area.

(3) Centerline Average Surface Roughness

The centerline surface roughness is determined in accordance with JIS B 0601-1976 with a cutoff value of 0.25 mm.

(4) Undulation Index

The surface of the porous layer is observed with a scanning electromicroscope equipped with a cross-section analyzing apparatus (ESM-3200 commercially available from Elionics, Co., Ltd.) at a magnification of 3000 times and a surface roughness curve is prepared by the conventional method. From the surface roughness curve, a centerline surface roughness ($Ra_{10}$) at a cutoff value of 10 $\mu$m and a centerline surface roughness ($Ra_1$) at a cutoff value of 1 $\mu$m are determined, and the undulation index is calculated by the following equation:

$$\text{Undulation Index } (\mu\text{m}) = Ra_{10} - Ra_1$$

The undulation indices shown in the example below were average of 50 measurements.

(5) Absorption Rate

Using a red ink (commercially available from Toka Shikiso, Co., Ltd.) for Alpo synthetic paper, which is an ink for offset printing, offset printing was performed using a printing tester (RI - 3 tester commercially available from Akira Seisakusho, Co., Ltd.). The amount of the applied ink was 3 $\mu$m in thickness. An OK-coating paper (commercially available from Oji Seishi, Co., Ltd.) is laminated on the printed surface such that the OK coating contacts the printed surface, and the resulting laminate was pressed with a metal roll at a line pressure of 353 g/cm. The time required for the ink on the printed surface not to transcribed to the OK-coating paper was determined by gross examination and the time is defined as an absorption rate.

(6) Clearness and Blotting of the Printed Surface

The printing was performed in the same manner as in (5). The printed surface was grossly examined for the non-printed spots (spots at which the ink was not transcribed). The blotting of the ink was evaluated by observing the boundary between the printed ink and non-printed portion with a microscope at 100 magnifications. The evaluation was based on the following criteria:

●: Non-printed spots and blotting of the ink are not observed at all.

○: Although non-printed spots are not observed, the gloss of the surface is somewhat degraded and small degree of blotting is observed.

Δ: Non-printed spots are observed by gross examination in the number of 1–5 spots/10 cm$^2$, and the boundary is not clear.

X: A number of non-printed spots are observed and the degree of blotting is large.

(7) Strength of Coated Layer

The surface of the porous layer was crosscut so as to form a number of squares of 1 mm × 1 mm. An adhesive cellophane tape (commercially available from Nichiban Co., Ltd.) was pressed on the thus crosscut porous layer and the adhesive cellophane tape was pulled up at right angle to the film. The percentage of the remaining crosscut regions of the porous layer was determined. The strength of the coated porous layer was evaluated in accordance with the following criteria:

Remaining Ratio of 80% or more : (excellent)
Remaining Ratio of less than 80% [X] (bad).

(8) Average Particle Size

The particle diameter is measured by the light scattering method with a submicron particle analyzer (COUL- TER N4 type, commercially available from Nikkaki Co., Ltd). The values shown in the examples below are the average of 10 times measurements. In cases where the particle diameter cannot be determined by this method, the particle diameter is determined by observing the particles with an electromicroscope at 200,000 magnifications.

(9) Average Particle Number

From the average particle size (a) determined as mentioned above and the specific gravity ($\rho$) of the particle, the average number of the particles contained in 1 $cm^3$ of the aqueous dispersion of V% by weight is calculated by the following equation:

$$\text{Average Particle Number} = \frac{1\ \text{cm}^3 \times (v/100) \times \rho^{-1}}{4/3 \cdot \pi(a/2 \times 10^{-4}\ \text{cm})^3}$$

[Examples]

The present invention will now be described in more detail by way of examples thereof. It should be understood that the examples are presented for the illustration purpose only and should not be interpreted in any restrictive way.

Example 1

On one surface of a biaxially oriented PET film having a centerline average surface roughness of 0.053 μm, whiteness of 93% and a thickness of 100 μm, a coating solution having the composition described below was applied to a thickness of 10 μm, and the coated layer was dried at 130° C. for 2 minutes. The surface of the PET film had been subjected to corona discharge treatment in the air.

[Composition of Coating Solution]

Seventy parts by weight of an acrylic polymer emulsion (methylmethacrylate/ethylacrylate/acrylic acid (60/35/5 by weight) having an average particle size of 0.2 μm and 30 parts by weight (solid content) of elongated colloidal silica in the form of branched or bent line having an average particle size of 0.015 μm (Snowtex Up commercially available from Nissan Chemicals, Inc.) were diluted with water to prepare a 30% by weight of aqueous dispersion.

The characteristics of the thus prepared surface porous film are shown in Table 1. As can be seen from Table 1, the peak pore diameter obtained from the pore diameter distribution curve and the undulation index are within the range defined in the present invention, and the absorption rate of the ink was large. Further, the clearness and blotting of the film were excellent and the porous layer had a satisfactory strength. Thus, the film showed excellent characteristics as the film for offset printing.

Comparative Examples 1 and 2

The same procedure as in Example 1 was repeated except that a spherical colloidal silica with an average particle size of 0.015 μm (Comparative Example 1) or a spherical colloidal silica with an average particle size of 0.2 μm (Comparative Example 2) was used in place of the elongated colloidal silica, to form surface porous films. As shown in Table 1, in Comparative Example 1, the undulation index is small and in Example 2, pores were not formed. In either cases, the absorption rate was small.

Examples 2 -4, Comparative Examples 3 -5

The same procedure as in Example 1 was repeated except that the average particle size of the acrylic polymer emulsion or the colloidal silica as well as the mixing ratio of the polymer and the elongated colloidal silica, to form surface porous films. Among the thus prepared films, those satisfying the peak pore diameter and undulation index defined in the present invention showed excellent characteristics. Especially, those having area pore ratio, surface roughness and circularity within the specific range (Examples 3 and 4) showed extremely good characteristics. On the other hand, the film of which peak pore diameter is larger than the range defined in the present invention (Comparative Example 3), the film of which undulation index is less than the range defined in the present invention (Comparative Example 4) and the film of which undulation index is larger than the range defined in the present invention (Comparative Example 5) showed inferior clearness, blotting and absorption rate.

TABLE 1

| | Ex. 1 | Com. Ex. 1 | Com. Ex. 2 | Ex. 2 | Ex. 3 | Ex. 4 | Com. Ex. 3 | Com. Ex. 4 | Com. Ex. 5 |
|---|---|---|---|---|---|---|---|---|---|
| Peak Pore Diameter in Pore Diameter Distribution Curve (μm) | 0.12 | 0.12 | No Pore | 0.08 | 0.11 | 0.68 | 2.31 | 0.13 | 0.14 |
| Undulation Index (μm) | 0.071 | 0.013 | 0.024 | 0.084 | 0.115 | 0.095 | 0.148 | 0.021 | 0.374 |
| Area Pore Ratio (%) | 48 | 46 | 0 | 45 | 58 | 71 | 88 | 47 | 36 |
| Centerline Surface Roughness (μm) | 0.14 | 0.06 | 0.07 | 0.17 | 0.15 | 0.19 | 0.53 | 0.08 | 0.66 |
| Circularity | 1.3 | 1.2 | — | 1.3 | 1.3 | 1.2 | 1.8 | 1.1 | 1.3 |
| Absorption Rate (min.) | 5 | 25 | 300< | 7 | 3 | 2 | 3 | 18 | 5 |
| Degree of Clearness and Blotting of Printed Surface | ⊚ | ⊚ | ⊚ | ⊚ | ⊚ | ⊚ | X | ⊚ | Δ |
| Strength of Coated Layer | ○ | ○ | ○ | ○ | ○ | ○ | X | ○ | X |

We claim:

1. A surface porous film comprising:

a plastic base film; and a porous layer formed on at least one of the surfaces of said plastic base film, said porous layer having a peak pore diameter of 0.06 -2.0 μm and an undulation index of 0.035 -0.3 μm.

2. The surface porous film of claim 1, wherein said porous layer consists essentially of a water-dispersible polymer and colloidal silica containing a plurality of linearly connected primary particles.

3. The surface porous film of claim 1, wherein said water-dispersible polymer is an acrylic polymer.

4. The surface porous film of claim 1, wherein said porous layer has an area pore ratio of 20 -85%.

5. The surface porous film of claim 1, wherein said porous layer has an average center line surface roughness of not more than 0.5 μm.

6. The surface porous film of claim 1, wherein said porous layer has through pores and said through pores have a circularity of 1 -5 when viewed from the surface of said porous layer.

7. The surface porous film of claim 1, at least one surface of which has a surface specific resistance of $10^8$-$10^{12}$Ω/□.

* * * * *